United States Patent [19]

Cuevas

[11] Patent Number: 5,388,858
[45] Date of Patent: Feb. 14, 1995

[54] AIR BAG MODULE STRUCTURE AND METHOD OF ASSEMBLY

[75] Inventor: Jess A. Cuevas, Scottsdale, Ariz.

[73] Assignee: TRW, Inc., Lyndhurst, Ohio

[21] Appl. No.: 661,102

[22] Filed: Feb. 25, 1991

[51] Int. Cl.[6] .......................................... B60R 21/16
[52] U.S. Cl. ................................. 280/728 A; 280/741
[58] Field of Search ............... 280/728, 731, 732, 741, 280/743, 736, 728 R, 743 R, 730 R, 728 A; 403/274, 283, 284; 29/513, 515

[56] References Cited

U.S. PATENT DOCUMENTS

| | | | |
|---|---|---|---|
| 1,251,927 | 1/1918 | Schneider | 24/111 |
| 1,255,877 | 2/1918 | Hawthorne | 362/375 |
| 1,710,999 | 4/1929 | Schmid | 29/513 |
| 1,996,109 | 2/1935 | Hiering | 29/513 |
| 2,154,296 | 4/1939 | Winkler | 29/513 |
| 2,350,651 | 6/1944 | Taubert et al. | 368/276 |
| 2,414,529 | 1/1947 | Ives | 220/315 |
| 2,533,779 | 12/1950 | Emde | 29/513 |
| 2,554,078 | 5/1951 | Werner . | |
| 2,616,587 | 11/1952 | Patch | 220/319 |
| 2,626,581 | 1/1953 | Almgren et al. | 413/27 |
| 2,725,252 | 11/1955 | Greer | 292/256.65 |
| 2,890,462 | 6/1959 | Ross | 4/636 |
| 3,104,905 | 9/1963 | Erdmann et al. | 292/256.6 |
| 3,120,402 | 2/1964 | Wallen | 285/305 |
| 3,302,221 | 2/1967 | Zysman . | |
| 3,534,466 | 10/1970 | Ardolino et al. | 29/509 |
| 3,661,235 | 5/1972 | Harrison | 188/218 X |
| 3,819,205 | 6/1974 | Dunford et al. . | |
| 3,867,055 | 2/1975 | Wooden | 403/373 |
| 3,888,063 | 6/1975 | Frantz | 403/172 |
| 3,942,391 | 3/1976 | Barth et al. . | |
| 4,109,368 | 8/1978 | Hubbard et al. | 29/513 X |
| 4,325,568 | 4/1982 | Clark et al. . | |
| 4,442,586 | 4/1984 | Ridenour | 29/511 |
| 4,489,850 | 12/1984 | Reneau | 220/323 |
| 4,625,754 | 12/1986 | Wilson et al. | 137/315 |
| 4,828,300 | 5/1989 | Agbay | 292/256.6 |
| 4,830,401 | 5/1989 | Honda . | |
| 4,835,850 | 6/1989 | Eckold et al. | 29/243.529 |
| 4,877,264 | 10/1989 | Cuevas | 280/731 |
| 4,902,036 | 2/1990 | Zander et al. | 280/743 X |
| 4,913,461 | 4/1990 | Cuevas | 280/731 |
| 4,988,119 | 1/1991 | Hartmeyer . | |
| 5,141,247 | 8/1992 | Barth . | |

FOREIGN PATENT DOCUMENTS

| | | |
|---|---|---|
| 3545028 | 7/1987 | Germany . |
| 0160765 | 6/1989 | Japan . |

*Primary Examiner*—Karin L. Tyson
*Attorney, Agent, or Firm*—Calfee, Halter & Griswold

[57] ABSTRACT

A vehicle air bag module is designed to be simply and efficiently assembled, without the use of fasteners such as bolts or rivets. The module is formed by a housing member and a retainer member. Each of the housing member and the retainer member includes integral structure enabling them to be coupled together without the use of additional fasteners such as bolts or rivets. When coupled together, the housing member and the retainer member are adapted to (i) capture and align an inflator in the housing member and (ii) capture and retain the mouth of an air bag in the housing member. Moreover, the air bag module is designed with additional connecting structure which enables the module to be coupled with a vehicle.

22 Claims, 5 Drawing Sheets

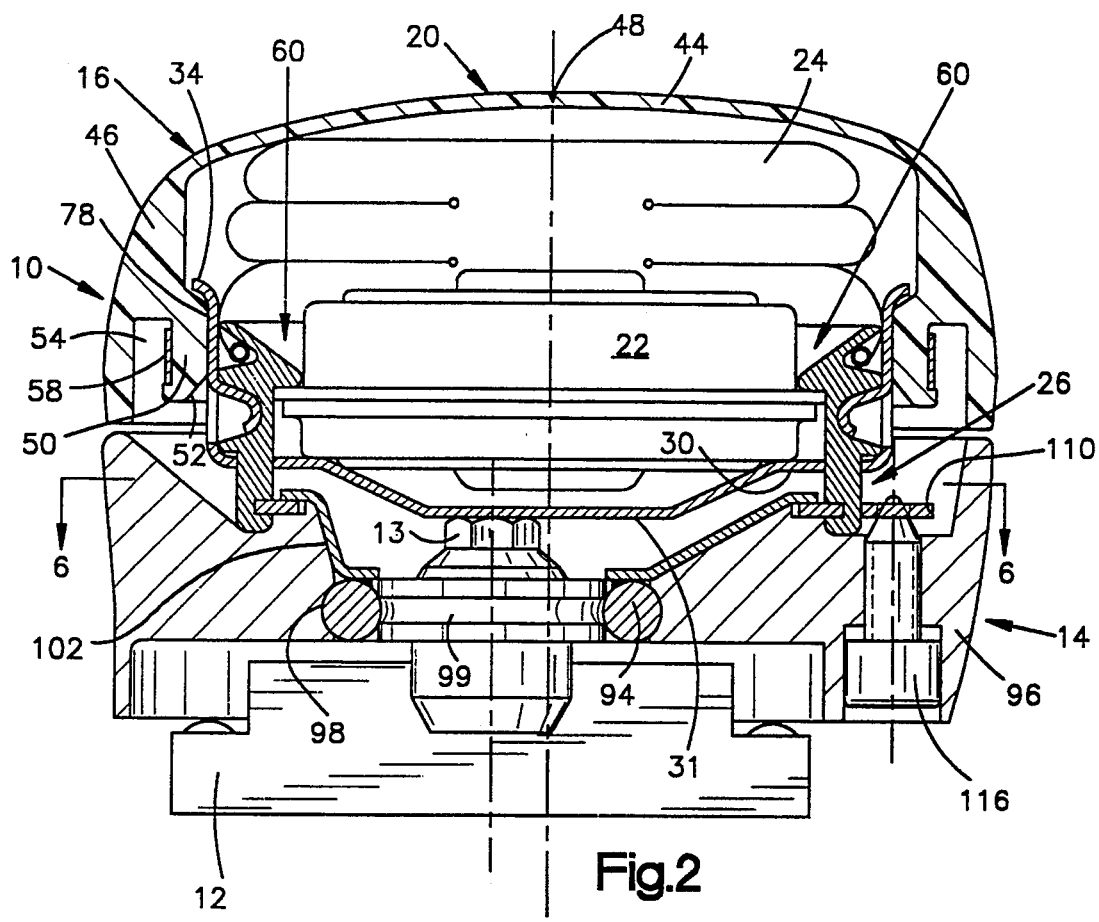
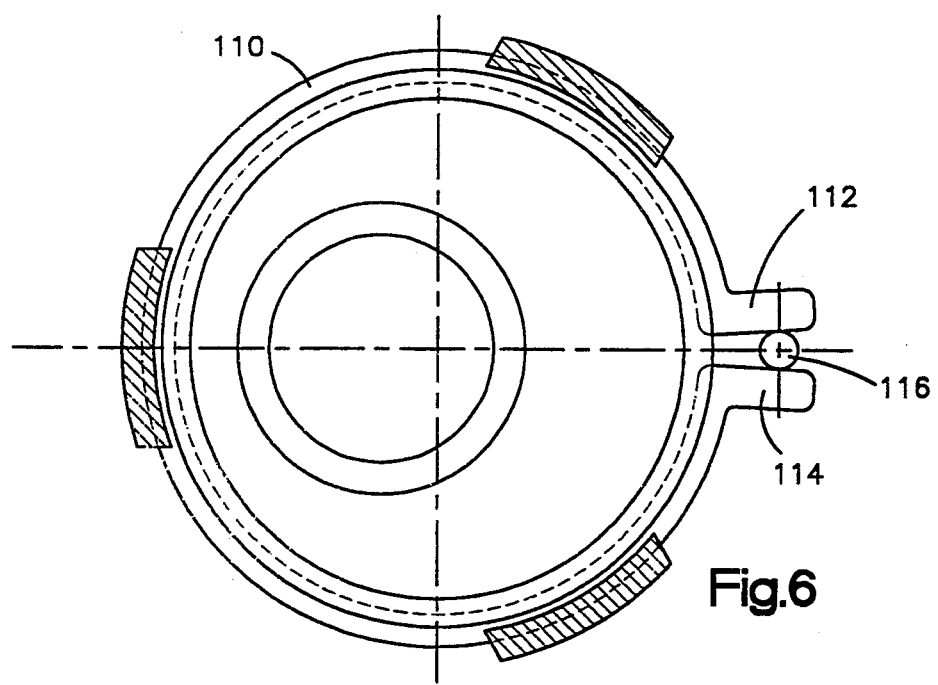

5,388,858

AIR BAG MODULE STRUCTURE AND METHOD OF ASSEMBLY

TECHNICAL FIELD

The present invention relates to a vehicle air bag module designed to be simply and efficiently assembled without the use of fasteners such as bolts or rivets.

BACKGROUND

A vehicle air bag module typically includes an air bag and an inflator disposed within a container. The container comprises a reaction device (e.g., a reaction can or a reaction plate) and a cover coupled to the reaction device to complete an enclosure for the inflator and the air bag. The module is assembled by coupling the air bag and inflator to the reaction device by means of fasteners such as bolts or rivets, and then coupling the cover to the reaction device by means of additional fasteners. The module is installed in a vehicle by coupling the reaction device to a structural part of a vehicle (e.g., a steering column) by means of still more fasteners.

At the onset of a vehicle collision, the inflator rapidly generates an inert, non-toxic gas, and directs that gas into the air bag. The gas forces the air bag through the cover and inflates the air bag. During inflation of the air bag, the inflator and the air bag apply significant forces to the reaction device. Those forces are, in turn, taken up and transmitted to the vehicle by (i) the reaction device, (ii) the fasteners which couple the inflator and the air bag to the reaction device and (iii) the fasteners which couple the reaction device to the vehicle.

Using fasteners such as bolts or rivets in assembling an air bag module does present some important procedural and economic considerations, especially with respect to the mass production of air bag modules. One procedural consideration is that in assembling an air bag module, bolt holes formed in an air bag and in an inflator housing must be carefully aligned with bolt holes in the reaction device in order to couple the air bag and the inflator properly with the reaction device. Another procedural consideration is that the bolts or rivets which couple an air bag and/or an inflator to a module housing are normally attached to each of those components sequentially rather than simultaneously. An important economic (or procurement) consideration is that the bolts and rivets used in the assembly and installation of the module are additional parts which generally have to be sourced separately from the other components of the module.

SUMMARY OF THE INVENTION

The present invention provides a new and useful air bag module structure and a new and useful technique for assembling an air bag module. The module structure and the assembly technique are designed to enable the module to be simply and efficiently assembled, without the need for fasteners such as bolts or rivets. Moreover, the module structure and the assembly technique are believed to be particularly well suited for assembly of air bag modules by mass production methods.

According to the invention, an air bag module comprises (a) a reaction device formed by a housing member and (b) a retainer member adapted to be coupled to the housing member. The housing member defines a cavity for receiving an inflator and a part of an air bag. The retainer member is designed to be inserted into the cavity. A portion of the housing member is adapted to be deformed into engagement with a portion of the retainer member, to couple the housing member with the retainer member without bolts, rivets or similar fasteners. The retainer member cooperates with the housing member to retain the inflator and the part of the air bag in the cavity in the housing member. A cover is adapted to be coupled to the housing member, also without the use of bolts or rivets, to complete the air bag module.

According to the preferred embodiment, the housing member is generally cup-shaped and includes an annular sidewall. A plurality of bendable locking tabs are formed in one piece with the annular sidewall of the housing member and are spaced around the annular sidewall. The retainer member is annular and is dimensioned to be inserted into the cup-shaped housing member in a close-fitting relationship with the annular sidewall. The retainer member also has an annular locking recess into which the locking tabs on the housing member can be bent, in order to couple the housing member with the retainer member. The retainer member has an annular air bag recess which faces the annular sidewall of the housing member when the retainer member is coupled to the housing member. The air bag recess is dimensioned to receive an annular bead at the mouth of a vehicle air bag and cooperates with the housing member to capture and retain the annular bead. Moreover, the retainer member and the housing member are configured to align and retain an inflator in the housing member as the retainer member and the housing member are being coupled together.

Further according to the preferred embodiment, a coupling device is formed in one piece with the retainer member. When the retainer member is coupled with the housing member, the coupling device extends out of the housing member. The coupling device is also adapted to be attached with a structural part of a vehicle (e.g., a steering column), to couple the module to the vehicle.

In assembling the air bag module, the inflator is initially seated within the cavity in the housing member. The bead at the mouth of the air bag is disposed in the air bag recess in the retainer member. The retainer member is then inserted into the cavity in the cup-shaped housing member to align and capture the inflator between the housing member and the retainer member, and to capture the bead at the mouth of the air bag between the retainer member and the housing member. Next, the bendable locking tabs on the housing member are bent inwardly into the locking recess in the retainer member, to couple the retainer member, the inflator and the mouth of the air bag with the housing member. After the retainer member, the air bag and the inflator are coupled with the housing member, a cover is attached to the housing member to complete the module.

One particularly useful feature of the invention is that the bead of the mouth of an air bag can be simply and efficiently preassembled with the retainer member, and both the air bag and the inflator are coupled to the housing member as the retainer member is coupled with the housing member. Such a feature is believed to make the module simple and efficient to assemble, by mass production techniques.

Another useful feature of the invention is that the bendable locking tabs on the housing member are designed to be simultaneously bent into engagement with the locking recess in the retainer member, by means of a crimping apparatus using conventional crimping techniques. That feature is also useful in the mass production of air bag modules.

Still another useful feature of the invention is that the bendable locking tabs are formed in one piece with the housing member. Such a feature reduces the number of parts required to form the module, and avoids separate fasteners being an economic (or procurement) factor in the assembly of the air bag module.

Yet another useful feature of the invention is that the structure can be incorporated into a vehicle in such a way that the bendable locking tabs are put under compression during deployment of the air bag, thereby absorbing forces during deployment.

Further features of the present invention will become apparent from the following detailed description and the accompanying drawings.

BRIEF DESCRIPTION OF THE DRAWINGS

FIG. 2 is a sectional illustration of an air bag module according to the invention installed in a vehicle steering column;

FIG. 6 is a sectional view of the module of FIG. 2, taken along the line 6—6, with portions omitted, and illustrating the expansible locking ring securing the module to a vehicle.

DETAILED DESCRIPTION OF THE PREFERRED EMBODIMENT

As described above, the present invention relates to an air bag module structure and to a method for forming the module. The air bag module structure and the assembly process described below are designed for an air bag module intended for the driver side of a vehicle. However, the same concepts can be applied to the design and assembly of an air bag module for the passenger side of a vehicle.

Figure 1:
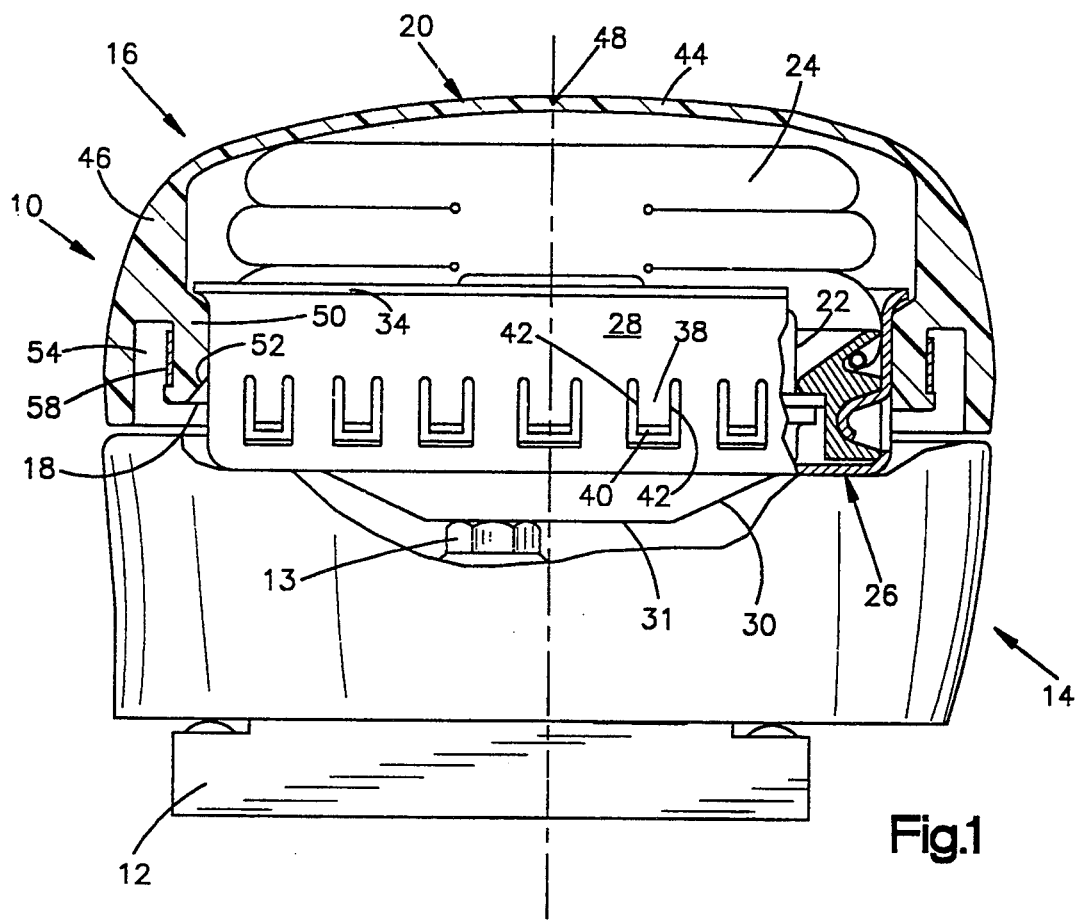
FIG. 1 is a schematic illustration of an air bag module constructed according to the present invention, installed in a vehicle steering column, with certain portions shown in section.
Figure 3:
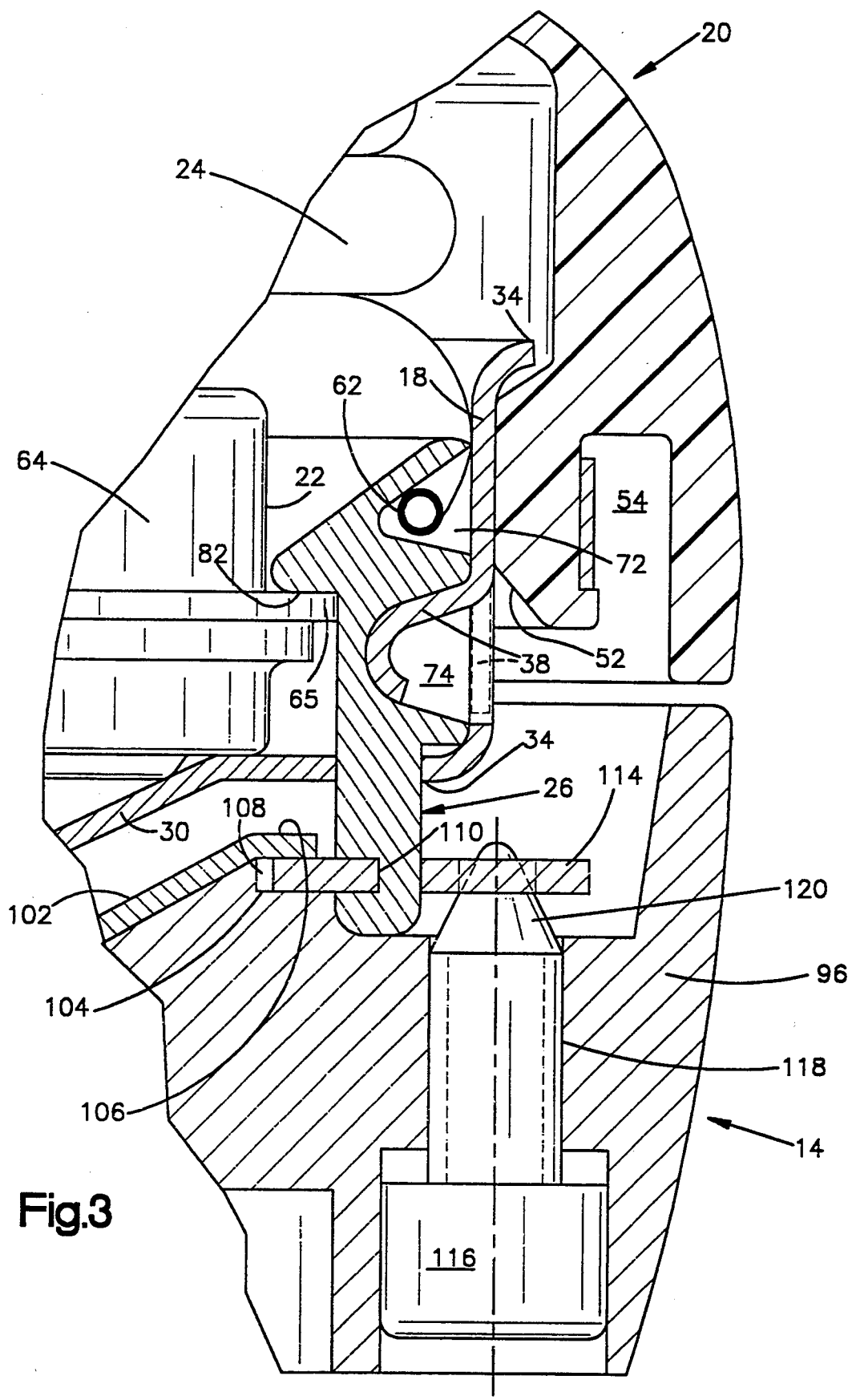
FIG. 3 is an enlarged, sectional view of a fragmentary portion of an air bag module according to the invention, installed in a vehicle steering column.

As shown in FIGS. 1–3, an air bag module 10, constructed according to the invention, is located on top of a vehicle steering column 12. The air bag module 10 is located above the wheel nut 13 which couples the steering wheel (not shown) to the upper portion 14 of the steering column.

The air bag module 10 (FIG. 4) includes a container 16 formed by a cup-shaped housing member 18 and a cover, indicated generally at 20. An inflator 22 and an air bag 24 are disposed in the container 16. A retainer member 26 (FIGS. 1–5), described more fully hereinafter, is disposed in the housing member 18. The retainer member 26 is coupled to the housing member 18, and cooperates with the housing member 18 to maintain the inflator 22 and the air bag 24 coupled with the housing member 18. The container 16 is adapted to be coupled to the upper portion 14 of the vehicle steering column to install the module 10 in a vehicle.

The cup-shaped housing member 18 is preferably formed of 6061-T6 aluminum. The housing member 18 has an annular sidewall 28 and a bottom wall 30 formed in one piece with the side wall 28. The bottom wall 30 includes a frustoconical central portion 31. Together the side wall 28 and the bottom wall 30 define a cavity, indicated generally at 32 (FIG. 4), for receiving the inflator 22 and a portion of the air bag 24. The housing member 18 has a radially outwardly extending flange 34 extending circumferentially around the top end of the side wall 28.

The bottom wall 30 of the housing member 18 includes a series of arcuate openings 36. (FIGS. 3, 4) The centers of the arcuate openings 36 are spaced apart from each other by about 120°. The annular side wall 28 also includes a plurality of bendable locking tabs 38. The locking tabs 38 are generally rectangular in shape, and each tab has a free end 40 and a pair of sides 42. The locking tabs 38 are cut from the material of the side wall 28 and are adapted to be bent inward from the annular side wall 28.

The module cover 20 is preferably formed of a tough, flexible plastic such as polypropylene. The cover 20 includes a circular front portion 44 and an annular side portion 46. The front portion 44 has a designed weakness (e.g., one or more V-shaped grooves 48) which enables the front portion 44 to rupture to enable the air bag 24 to be forced through the cover 20 during deployment of the air bag 24.

The side portion 46 includes an annular wall 50 dimensioned to fit tightly around the housing member 18 when the cover is assembled with the housing member. The wall 50 has a ramp 52 at its lower end on a radially inner surface of the wall. An annular slot 54 is formed in the lower end of the wall 50 at a position radially outward of the ramp 52. The slot 54 permits the ramp 52 and the adjacent portion of the wall 50 to flex outwardly.

The cover 20 is assembled with the housing member 18 by pressing the cover downward onto the housing member. As the cover 20 is pressed downward, the ramp 52 on the cover engages the flange 34 on the housing member 18. The ramp 52 and the adjacent portion of the wall 50 flex outward to enable the wall to encircle the housing member 18. The annular slot 54 is dimensioned to receive a band 58 which can be tightened against the annular wall 50 to maintain the cover 20 coupled with the housing member 18.

The air bag 24 is conventional in design and is formed from nylon or other flexible fabric. The air bag 24 includes an annular mouth, indicated generally at 60, defining a gas inlet opening through which gas can be directed into the air bag. As shown in FIG. 3, the mouth 60 of the air bag includes a relatively thick bead 62, preferably formed by stitching a portion of the air bag fabric around a nylon cord (not shown). The bead 62 reinforces the mouth 60 of the air bag 24, and is useful in coupling the mouth of the air bag 24 to the housing member 18. The air bag 24 is initially prefolded, by known means forming no part of this invention, and is coupled to the housing member 18 as a prefolded air bag unit. When coupled to the housing member 18, the bulk of the prefolded air bag unit is located outside of the housing member 18.

The inflator 22 comprises a substantially cylindrical housing 64 with an annular, outwardly extending flange 65. The housing 64 encloses a gas generant, a filter structure and an ignitor device (not shown). At the onset of a collision, the ignitor is actuated and ignites the gas generant. The gas generant rapidly generates an inert, non-toxic gas (e.g., nitrogen) which is filtered and then directed through gas dispensing nozzles (not shown) in the inflator housing 64. The gas generant can be of any suitable formulation, including the formulations disclosed in Pietz U.S. Pat. No. 3,895,098. Similar, the filter structure can be of any known construction, including that shown in Zander, et al, U.S. Pat. No. 4,902,036, which is a preferred construction.

Figure 5:
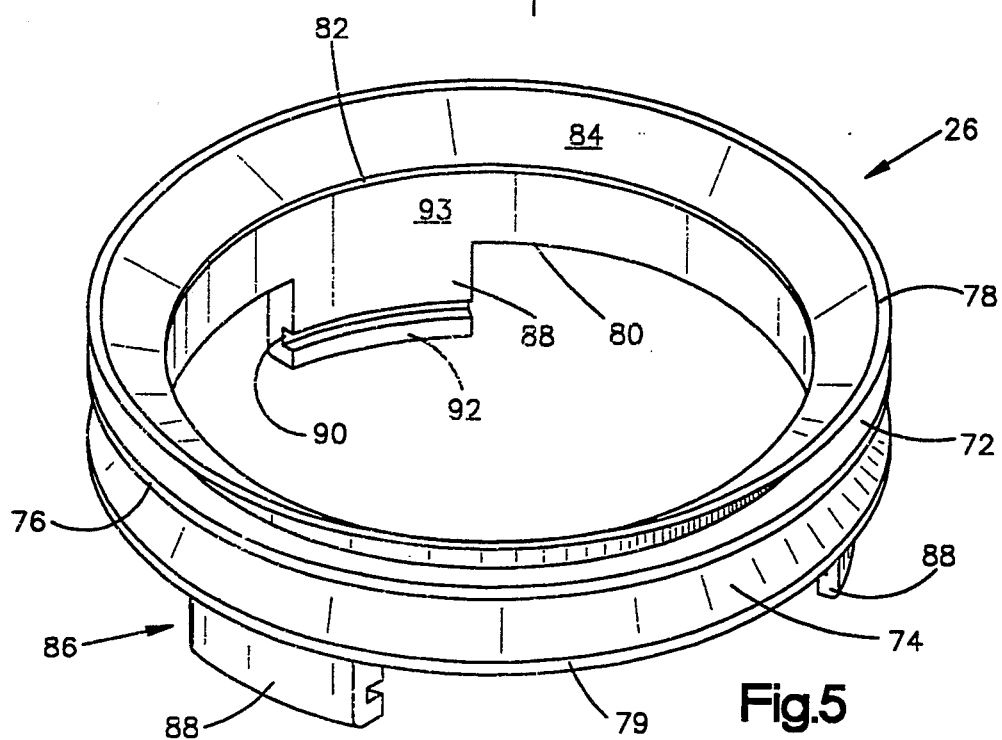
FIG. 5 is a perspective illustration of a retainer member for use in forming an air bag module according to the present invention.
Figure 4:
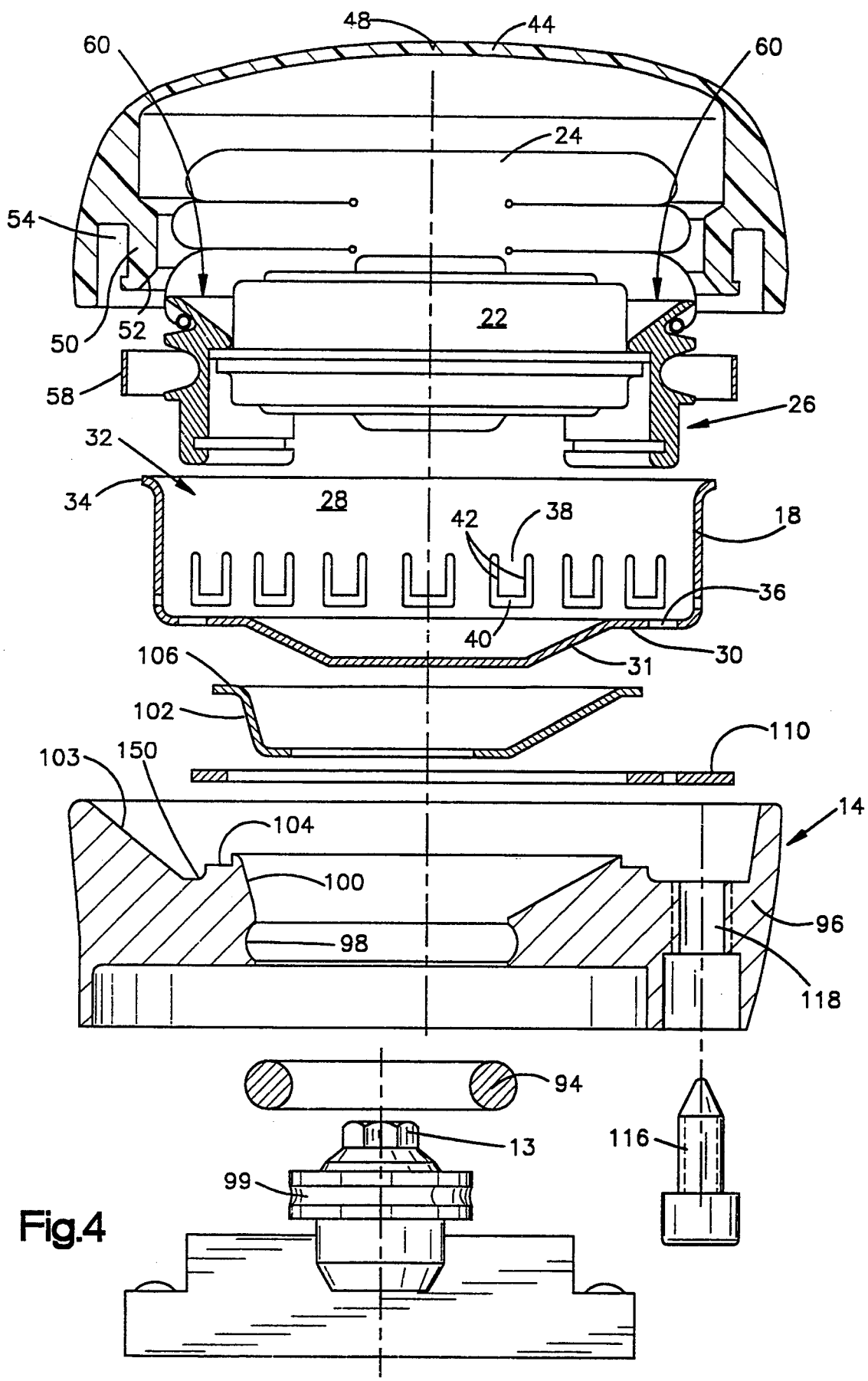
FIG. 4 is an exploded view of components for forming an air bag module and installing the module in a vehicle steering column.

Both the air bag 24 and the inflator 22 are coupled with the housing member 18 by the retainer member 26. The retainer member 26 is formed from relatively rigid material and, as shown in FIG. 5, is annular in shape. The retainer member 26 includes an annular inner wall 93 and a radially outer surface 76 that is dimensioned for a relatively tight fit in the cavity 32 against the wall 28 of the housing member 18 (FIG. 4). An annular air bag recess 72 and an annular locking recess 74 are formed in the radially outer surface 76 of the retainer member 26. The air bag recess 72 is formed near the top end 78 of the retainer member 26. The locking recess 74 is formed near the lower end 79 of the retainer member 26. Moreover, the lower end 79 of the retainer member 26 includes a radially extending, annular bottom surface 80. The retainer member 26 has an annular, inwardly projecting lip 82 formed by the radially inner surface 84 and the retainer member wall 93. The lip 82 has an inner diameter that is smaller than the radially outer diameter of the flange 65 of the inflator 22. The portion of the inner wall 93 below the lip 82 has a diameter substantially the same as the outer diameter of the inflator housing 64.

A coupling device, indicated generally at 86, is formed in one piece with the retainer member 26. The coupling device 86 comprises three coupling members 88, each extending axially away from the bottom surface 80 of the retainer member 26. Preferably, the centers of the coupling members 88 are disposed 120° apart from each other. Each coupling member 88 includes a locking groove 90 formed adjacent the distal end 92 of the coupling member. The locking grooves 92 face radially inward with respect to the annular inner wall 93. The coupling members 88 are located and dimensioned to extend through the arcuate openings 36 in the bottom wall 30 of the housing member 18 when the retainer member 26 is inserted into the housing member 18.

As shown in FIGS. 2–4, the upper portion 14 of the steering column includes the wheel nut 13, a spoke ring 94, and a shroud 96. The shroud 96 is annular in shape. The radially inner surface of the shroud includes an upper frustoconically shaped surface portion 100 and a lower surface portion defining an annular recess 98. The spoke ring 94 is adapted to fit into the annular recess 98, in the shroud 96 and a corresponding recess 99 in the wheel nut 13 to secure the shroud 96 to the wheel nut 13. The frustoconically shaped surface portion 100 of the shroud 96 is adapted to receive a frustoconically shaped bracket 102. The bracket 102 is welded to the wheel nut 13 and to the spoke ring 94.

The top surface 103 (FIG. 4) of the shroud defines an annular stepped portion 104 surrounded by an annular trough 150. The annular stepped portion 104 cooperates with an annular radially extending flange 106 at the top of the bracket 102 to form a groove 108 (See FIGS. 2, 3). The groove 108 is adapted to receive the inner portion of an expansible retaining ring 110.

The retaining ring 110 is generally annular in shape and is preferably formed from stainless steel or similar material. The retaining ring 110 is split, and has two closely spaced tabs 112, 114 (FIGS. 3, 6) formed in one piece with the ends of the retaining ring 110 adjacent the split in the ring. The tabs 112, 114 project radially outwardly from the annulus of the retaining ring 110.

The tabs 112, 114 are adapted to be forced apart, to increase the diameter of the retaining ring 110. Specifically, a spreader screw 116 is disposed in a threaded bore 118 formed in the shroud 96. Selectively rotating the spreader screw 116 within the threaded bore 118 moves a wedge shaped tip 120 of the screw 116 axially in a direction which forces the tabs 112, 114 apart and thereby increases the diameter of the retaining ring 110.

In assembling the air bag module 10, the inflator 22 is inserted into the cavity 32 in the housing member 18 so that the inflator rests on the bottom wall 30 of the housing member 18, as shown in FIGS. 1–3. The bead 62 at the mouth of the air bag is forced over the top end 78 of the retainer member 26 and into the air bag recess 72. Then, the retainer member 26, with the bead 62 of the air bag disposed in the air bag recess 72, is inserted into the housing member 18. The retainer member 26 is positioned in the housing member 18 such that the coupling members 88 extend through the arcuate openings 36 in the bottom wall 30 of the housing member 18. In addition, the bottom surface 79 on the retainer member 26 rests on the bottom wall 30 of the housing member 18.

As the retainer 26 is inserted into the housing member 18, the bead 62 on the air bag 24 is captured between the air bag recess 72 and the annular side wall 28 of the housing member 18. Moreover, the internal, lip 82 on the retainer member 26 engages the top of the flange 65 on the inflator 22. The inflator 22 is thus captured and positioned in the housing member 18 by the lip 82 and the bottom wall 30. Additionally, the annular locking recess 74 in the retainer member 26 is aligned with the bendable locking tabs 38 extending circumferentially around the housing member 18.

As it is inserted into the housing member, the retainer member 26 aligns the inflator 22 within the cavity 32 in the housing member 18. Specifically, the retainer member 26 is aligned in the cavity 32 by (i) the coupling members 88 which extend through the arcuate openings 36 in the housing member 18 and (ii) the tight fit between the annular wall 93 of the retainer member 26 and the side wall 28 of the housing member. Moreover, as discussed above, the inflator 22 is aligned in the retainer member 26 by (i) the engagement of the lip 82 on the retainer member with the flange 65 on the inflator and (ii) the close fit between the inflator housing 64 and the retainer member wall 93.

Figure 7:
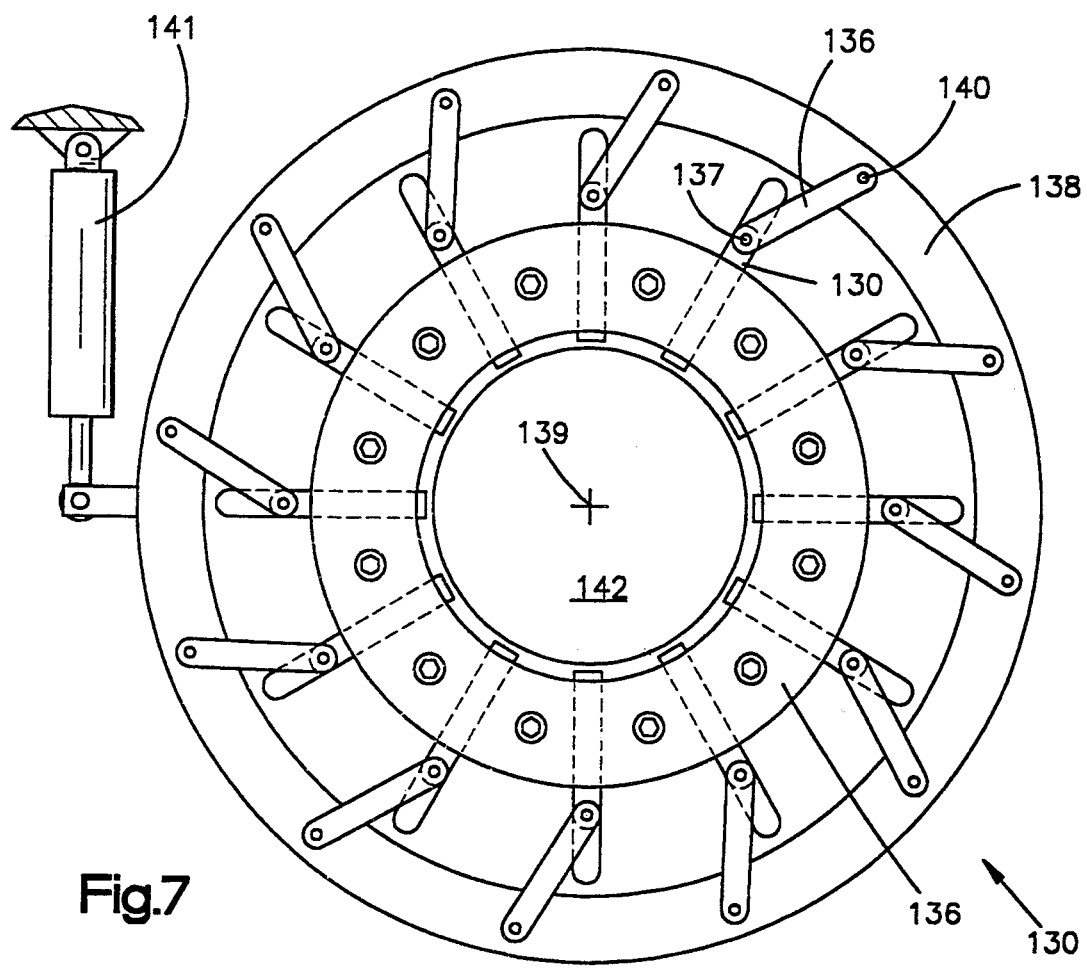
FIG. 7 is a top plan view of crimping apparatus for use in assembling an air bag module, according to the present invention.

After the retainer member 26, the inflator 22 and the bead 62 at the mouth of the air bag 24 are located and aligned within the housing member 18, the retainer member 26 is secured to the housing member. Preferably, a crimping machine, indicated generally at 130 in FIG. 7, is used to bend all of the locking tabs 38 in the side wall 28 of the housing member 18 simultaneously into the locking recess 74 in the retainer member 26.

The crimping machine 130 includes an annular array of radially extending crimp rods 132. Each crimp rod 132 is received within a guide slot 134 in a stationary inner plate 135. The radially inner end of each crimp rod 132 is adapted to engage and bend a respective locking tab 38 into the locking recess 74 in the retainer member 26. The radially outer end of each crimp rod 132 is pivotally connected to the radially inner end of a respective link 136 by means of a bolt 137 or similar fastener. The radially outer end of each link 136 is pivotally attached to an annular pivot plate 138 by a fastener 140. The pivot plate 138 is pivotally mounted about a central axis 139 and is adapted to be pivoted in opposite directions about the axis 139 by an air cylinder 141 or similar device.

The housing member 18, together with the retainer member 26, inflator 22 and air bag 24, is inserted into an opening 142 in the center of stationary inner plate 135. The pivot plate 138 is pivoted in one direction by the air cylinder 141, to force the crimp rods 132 radially inward and against their respective locking tabs 38. As the crimp rods 132 are forced inward, the locking tabs 38 are simultaneously crimped (bent) into the locking recess 74 in the retainer member 26. After the locking tabs 38 are bent into the locking recess 74, the air cylinder 141 reaches the end of its stroke. The air cylinder 141 then reverses the pivotal direction of plate 138, to draw the crimp rods 132 away from the locking tabs 38. The housing member 18, to which the retainer member 26, inflator 22 and air bag 24 are now secured, is then removed from the crimping machine 130.

After the retainer member 26, inflator 22 and air bag 24 have been coupled to the housing member 18, cover 20 is coupled to the housing member to complete the module 10. Specifically, the cover 20 is pressed downwardly over the air bag 24 and onto the housing member 18. As discussed above, when the cover 20 is pressed onto the housing member 18, the ramp 52 and the adjacent portion of the annular wall 50 of the cover flex radially outward to enable the cover to be inserted over the flange 34 of the housing member 18. The annular wall 50 snaps back into place after it has passed over the flange 34. The band 58 of sheet metal is then inserted into the slot 54 in the annular wall 30 and pulled to a predetermined tension to lock the cover 20 securely to the housing member 18, thereby to complete the module 10.

After the cover 20 is attached, the air bag module 10 is attached to the steering column of the vehicle. The module is preferably coupled to the steering column by means of a structure and technique set forth in a concurrently filed application of Jess Cuevas entitled "Air Bag Module Installation Structure and Method", Ser. No 660,566, filed Feb. 25, 1991, and assigned to the assignee of this application. Specifically, the air bag module 10 is positioned on top of the steering column with the frustoconical portion 31 of the bottom wall of the housing member 18 located in the frustoconically shaped bracket 102. The distal ends 92 of the coupling members 88 rest in the trough 150 formed in the upper surface 103 of the shroud 96. The expansible retaining ring 110 is located in the groove 108 and its diameter is increased by rotating spreader screw 116. As the diameter of the ring 110 increases, the retaining ring is forced into the grooves 90 in the coupling members 88. Thus, the ring 110 secures the module 10 to the steering column of the vehicle.

Alternatively, the air bag module 10 can be attached to the vehicle by attaching the housing member 18 directly to the steering column. For example, instead of the retainer member having the coupling members 88, the coupling members could be formed in one piece with the housing member 18. The housing member could then be coupled to the steering column by means of the retainer ring 110. The housing member 18 might also be connected to the steering column by means of conventional attachment members, such as brackets or nuts and bolts secured, to either the sides 28 or the bottom 30 of the housing 18 and to the steering column of the vehicle.

With either of the foregoing embodiments, the locking tabs would be placed into compression as the air bag is deployed to absorb at least part of the forces during deployment. In particular, the retainer member 26 would be forced outwardly from the housing member 18 by inflation forces associated with the air bag deployment. As the retainer member 26 is forced outwardly, contacting portions of the retainer member 26 are forced against the locking tabs 38, which accordingly places the tabs under compression.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the spirit of the present invention. Accordingly, the foregoing detailed description should be exemplary in nature and not as limiting to the scope and spirit of the invention set forth in the appended claims.

What is claimed is:

1. A vehicle air bag module structure comprising:
    a housing member defining a cavity; and
    a retainer member disposed in said cavity,
        said housing member including a plurality of separate deformable portions deformed into engagement with a selected portion of said retainer member to couple said retainer member to said housing member,
        said retainer member and housing member being adapted to capture and retain selected portions of an air bag and an inflator within said cavity in said housing member.

2. A vehicle air bag module structure as set forth in claim 1, wherein said plurality of separate deformable portions of said housing member are adapted to be bent into engagement with said selected portion of said retainer member to couple said housing member with said retainer member.

3. A vehicle air bag module structure as set forth in claim 2, wherein said housing member includes an annular side wall and said plurality of separate deformable portions of said housing member comprise a plurality of bendable locking tabs, each of said bendable locking tabs being bent out of the annulus of said annular side wall and into engagement with said selected portion of said retainer member.

4. A vehicle air bag module structure as set forth in claim 3, wherein said retainer member comprises an annular retainer ring dimensioned to be disposed closely adjacent said annular side wall of said housing member.

5. A vehicle air bag module structure as set forth in claim 4, wherein said selected portion of said retainer member includes an annular locking recess.

6. A vehicle air bag module structure as set forth in claim 5, wherein said retainer member also includes an annular air bag recess disposed in facing relation to said annular side wall of said housing member, said annular air bag recess and said annular side wall being adapted to co-operate to capture and retain a selected portion of an air bag in said cavity in said housing member.

7. A vehicle air bag module structure as set forth in claim 6, wherein said retainer member and said housing member have respective inflator wall surfaces adapted to capture and retain the inflator therebetween.

8. A vehicle air bag module structure as set forth in claim 7, wherein said retainer member is adapted to align an inflator in a predetermined orientation in said housing member.

9. A vehicle air bag module structure as set forth in claim 7, wherein said retainer member has an inner surface and an outer surface, said air bag recess and said locking recess being formed by said outer surface, and said inflator wall surface of said retainer member being formed by said inner surface of said retainer member.

10. A vehicle air bag module structure as set forth in claim 9, further including a cover forming a closure for said cavity in said housing member, said cover being secured to said housing member by means of a deformable element.

11. A vehicle air bag module structure as set forth in claim 10, wherein said deformable element comprises a strip of flexible material.

12. A method for forming a vehicle air bag module structure comprising the steps of:
locating an inflator in a cavity formed in a housing member;
locating a retainer member in the cavity in the housing member and capturing the inflator in the cavity between a portion of the retainer member and a portion of the housing member; and
deforming selected separate portions of the housing member into engagement with a selected portion of said retainer member to couple the housing member with the retainer member, thereby retaining the inflator in the cavity in the housing member.

13. A method as set forth in claim 12, further comprising the step of preassembling selected separate portions of an air bag with said retainer member before said retainer member is located in the housing member, and wherein the step of locating a retainer member in the cavity includes capturing the selected portion of the air bag between the retainer member and a portion of the housing member.

14. A method as set forth in claim 12, wherein the step of deforming selected separate portions of the housing member into engagement with a selected portion of the retainer member comprises bending the selected separate portions of the housing member into engagement with the selected portion of the retainer member.

15. A method as set forth in claim 14, wherein the housing member includes a plurality of deformable locking members formed in one piece with the housing member, and the step of deforming the selected separate portions of the housing member comprises simultaneously deforming the plurality of deformable locking members into engagement with the selected portion of the retainer member.

16. A method for forming a vehicle air bag module structure comprising the steps of:
preassembling a selected portion of an air bag with a retainer member;
locating the retainer member in a cavity formed in a housing member and capturing the air bag in the cavity between a portion of the retainer member and a portion of the housing member; and
deforming selected separate portions of the housing member into engagement with a selected portion of said retainer member to couple the housing member with the retainer member, thereby retaining the air bag in the cavity in the housing member.

17. A method as set forth in claim 16, wherein the step of deforming selected separate portions of the housing member into engagement with a selected portion of the retainer member comprises bending the selected separate portions of the housing member into engagement with the selected portion of the retainer member.

18. A method as set forth in claim 17, wherein the housing member includes a plurality of deformable locking members formed in one piece with the housing member, and the step of deforming the selected separate portions of the housing member comprises simultaneously deforming the plurality of deformable locking members into engagement with the selected portion of the retainer member.

19. A vehicle air bag module structure comprising:
a housing member defining a cavity, said housing member including an annular sidewall; and
an annular retainer ring disposed in said cavity closely adjacent said annular sidewall of said housing member,
said housing member including a plurality of bendable locking tabs, each of said bendable locking tabs adapted to be bent out of the annulus of said annular sidewall and into engagement with a selected portion of said annular retainer ring to couple said annular retainer ring to said housing member,
said annular retainer ring and housing member being adapted to capture and retain selected portions of an air bag and an inflator within said cavity within said housing member, and
further including coupling structure formed in one piece with said annular retainer ring, said coupling structure projecting out of said housing member and adapted to enable said retainer ring to be coupled to a portion of a vehicle.

20. A method for forming a vehicle air bag module structure comprising the steps of:
locating an inflator in a cavity formed in a housing member;
locating a retainer member in the cavity in the housing member and capturing the inflator in the cavity between a portion of the retainer member and a portion of the housing member, said retainer member including coupling structure projecting out of said housing member and adapted to enable said retainer member to be coupled to a portion of a vehicle; and
deforming a selected portion of the housing member into engagement with a selected portion of said retainer member to couple the housing member with the retainer member, thereby retaining the inflator in the cavity in the housing member.

21. A method for forming a vehicle air bag module structure comprising the steps of:
preassembling a selected portion of an air bag with a retainer member;

locating the retainer member in a cavity formed in a housing member and capturing the air bag in the cavity between a portion of the retainer member and a portion of the housing member, said retainer member having coupling structure projecting out of said housing member and adapted to enable said retainer member to be coupled to a portion of a vehicle; and deforming a selected portion of the housing member into engagement with a selected portion of said retainer member to couple the housing member with the retainer member, thereby retaining the air bag in the cavity in the housing member.

22. A vehicle air bag module structure as set forth in claim 3, wherein said annular sidewall includes a plurality of bendable locking tabs separated by non-bendable portions of said sidewall.

* * * * *